(12) United States Patent
Ko et al.

(10) Patent No.: US 8,883,364 B2
(45) Date of Patent: Nov. 11, 2014

(54) MANIFOLD INSERT HAVING DISTRIBUTION GUIDES AND FUEL CELL STACK COMPRISING THE SAME

(75) Inventors: Haeng Jin Ko, Seoul (KR); Young Bum Kum, Seoul (KR); Gi Young Nam, Gyeonggi-do (KR); Yun Seok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 823 days.

(21) Appl. No.: 13/103,200

(22) Filed: May 9, 2011

(65) Prior Publication Data

US 2012/0122008 A1 May 17, 2012

(30) Foreign Application Priority Data

Nov. 17, 2010 (KR) .................. 10-2010-0114456

(51) Int. Cl.
| | |
|---|---|
| *H01M 2/38* | (2006.01) |
| *H01M 8/24* | (2006.01) |
| *B60L 3/00* | (2006.01) |
| *H01M 8/04* | (2006.01) |
| *B60L 11/18* | (2006.01) |
| *H01M 8/10* | (2006.01) |

(52) U.S. Cl.
CPC .............. *H01M 8/2485* (2013.01); *Y02T 90/34* (2013.01); *B60L 2240/36* (2013.01); *H01M 2008/1095* (2013.01); *B60L 3/0053* (2013.01); *H01M 8/04089* (2013.01); *Y02E 60/50* (2013.01); *B60L 11/1898* (2013.01)
USPC ........................................ 429/456; 429/514

(58) Field of Classification Search
USPC ......... 429/455, 456, 457, 458, 459, 512, 513, 429/514
See application file for complete search history.

(56) References Cited

U.S. PATENT DOCUMENTS

2005/0142421 A1   6/2005   Lisgaras et al.
2008/0233447 A1*  9/2008   Gemba et al. ................ 429/26

FOREIGN PATENT DOCUMENTS

| JP | 58201266 A | 11/1983 |
|---|---|---|
| JP | 2006-164831 | 6/2006 |
| JP | 2008-288080 | 11/2008 |
| KR | 10-2007-0025569 | 3/2007 |

* cited by examiner

*Primary Examiner* — Raymond Alejandro
(74) *Attorney, Agent, or Firm* — Edwards Wildman Palmer LLP; Peter F. Corless (57) ABSTRACT

A manifold insert installed in a fuel cell having distribution guides is provided. The manifold insert is configured to form a flow field from an inlet port of fluid to an outlet port connected to a fuel cell stack. This manifold insert includes a plurality of distribution guides that divide the flow field from the inlet port to the outlet port such that the fuel cell stack is divided into a plurality of regions according to the distance from the inlet port. The distribution guides have surfaces that are at least partially curved such that the flow of the fluid from the inlet port to the outlet port is changed by the curved surfaces and form a plurality of guide flow fields such that the fluid is supplied to the divided regions of the fuel cell stack along the plurality of guide flow fields at different flow rates.

10 Claims, 6 Drawing Sheets

MANIFOLD INSERT HAVING DISTRIBUTION GUIDES AND FUEL CELL STACK COMPRISING THE SAME

CROSS-REFERENCE TO RELATED APPLICATION

This application claims under 35 U.S.C. §119(a) the benefit of Korean Patent Application No. 10-2010-0114456 filed Nov. 17, 2010, the entire contents of which are incorporated herein by reference.

BACKGROUND (a) Technical Field

The present invention relates to a manifold insert having distribution guides and a fuel cell stack comprising the same. More particularly, it relates to a manifold insert having a plurality of distribution guides which can reduce output voltage deviation and prevent flow instability by stably distributing the flow of fluid supplied to a fuel cell stack, and a fuel cell stack comprising the same.

(b) Background Art

A fuel cell is an electricity generation system that electrochemically converts chemical energy directly into electrical energy in a fuel cell stack instead of converting chemical energy of fuel into heat by combustion. The fuel cell can be applied to the electric power supply of small-sized electrical and electronic devices, for example portable devices, as well as industrial and household appliances and vehicles.

A typical fuel cell system mounted in a vehicle comprises a fuel cell stack for generating electricity by an electrochemical reaction; a hydrogen supply system for supplying hydrogen as a fuel to the fuel cell stack; an oxygen (air) supply system for supplying oxygen-containing air as an oxidant required for the electrochemical reaction in the fuel cell stack; a thermal management system (TMS) for removing reaction heat from the fuel cell stack to the outside of the fuel cell system, controlling operation temperature of the fuel cell stack, and performing water management functions; and a system controller for controlling overall operation of the fuel cell system. The fuel cell system generates electricity by the electrochemical reaction of hydrogen and oxygen-containing air, and generates heat and water as by-products.

One of the most attractive fuel cells for a vehicle is a proton exchange membrane fuel cell or a polymer electrolyte membrane fuel cell (PEMFC). The fuel cell stack included in the PEMFC comprises a membrane electrode assembly (MEA), a gas diffusion layer (GDL), a gasket, a sealing member, and a bipolar plate. The MEA includes a polymer electrolyte membrane through which hydrogen ions are transported. An electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The bipolar plate functions to support the MEA and GDL, collect and transmit generated electricity, transmit reactant gases, transmit and remove reaction products, and transmit coolant to remove reaction heat, etc.

The fuel cell stack is formed of a plurality of unit cells, each unit cell including an anode, a cathode and an electrolyte (electrolyte membrane). Hydrogen is supplied to the anode ("fuel electrode" or "oxidation electrode") and oxygen-containing air is supplied to the cathode ("air electrode", "oxygen electrode" or "reduction electrode").

In a fuel cell vehicle having the above-described configuration, the MEA, the GDL, and the bipolar plate are sequentially and repeatedly stacked to form the fuel cell stack. Moreover, a manifold is integrally formed on the bipolar plate in the stacking direction of the unit cells. The manifold forms flow fields in the form of columns such that hydrogen, oxygen (air), and coolant flow through the flow fields.

Meanwhile, in the fuel cell vehicle, the rate of fuel consumption for each load is maintained constant to optimize the amount of hydrogen and oxygen consumed, which is defined as the stoichiometric ratio (SR). For example, the amount of hydrogen required to generate a current of 300 A is 231 SLPM (standard liters per minute), which is calculated by the stoichiometric ratio (SR).

To remove impurities, such as condensed water, and increase the potential in an actual system, the fuel is supplied in a stoichiometric ratio of 1.1 to 2.0 by supplying surplus hydrogen gas, which is the same as a gas containing an oxidant.

However, if a fuel cell stack with a higher volume power density (kW/L) is used to improve the power performance of the vehicle, the number of unit cells stacked in the fuel cell stack is increased. This increase causes non-uniformity of the flow rate of gas supplied to channels of the unit cells via the manifold for distributing the gas.

As the number of unit cells in the fuel cell stack increases, the size of the manifold is also increased such that the manifold can accommodate the flow of gas required for high power generation. Therefore, if the number of unit cells exceeds a predetermined range, the flow rate range for voltage stabilization is restricted or the stoichiometric ratio should be maintained at a high level, which causes deterioration of fuel efficiency. Therefore, it is necessary to provide an optimum manifold which can ensure a uniform flow of gas supplied to the unit cells without deteriorating the fuel efficiency.

Figure 1:
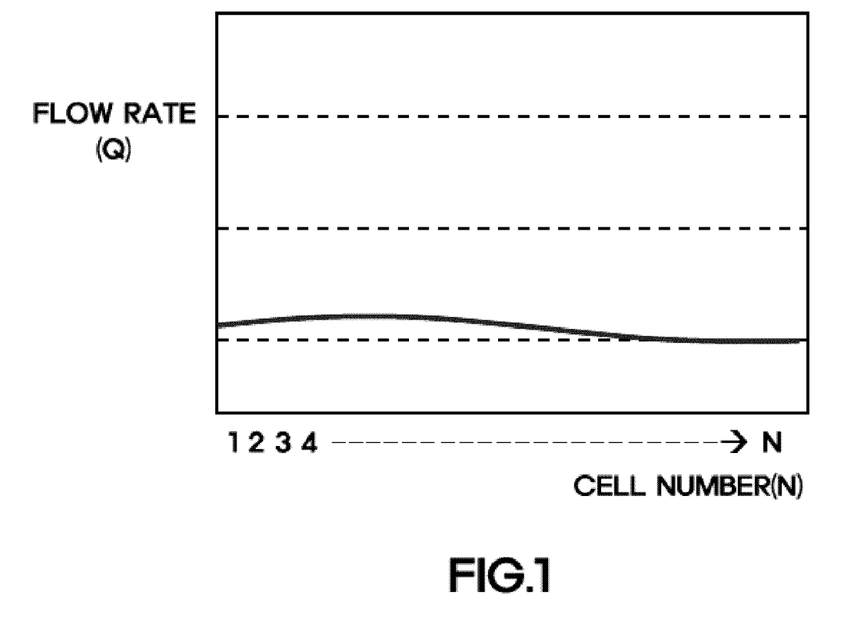
FIG. 1 is a graph showing the distribution of the flow of fluid supplied to a fuel cell stack during partial load operation (at low flow rate) with respect to the cell number (stacking order)
Figure 2:
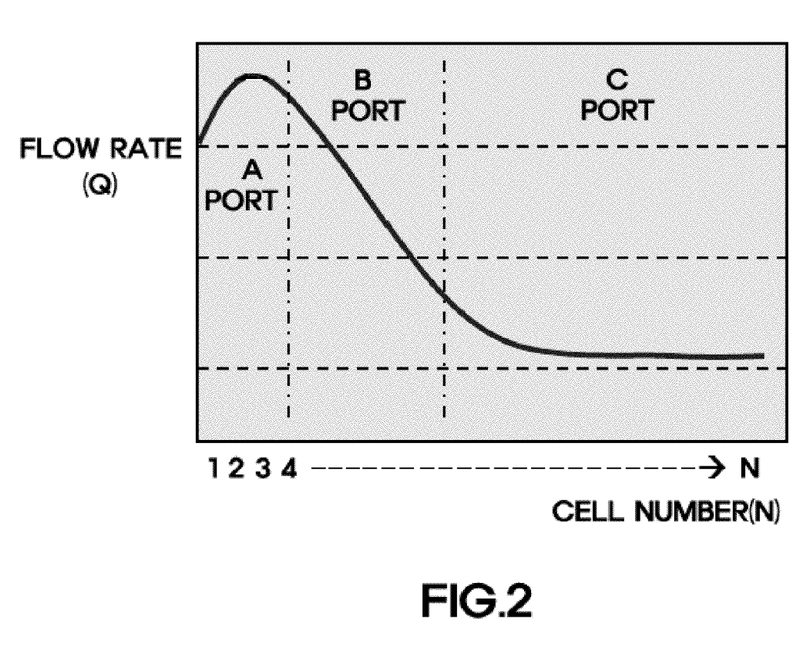
FIG. 2 is a graph showing the distribution of the flow of fluid supplied to a fuel cell stack during full load operation (at high flow rate) with respect to the cell number (stacking order)

FIGS. 1 and 2 show the distribution of the flow of fluid supplied to a fuel cell stack during partial load operation (at low flow rate, FIG. 1) and during full load operation (at high flow rate, FIG. 2) with respect to the cell number.

As shown in FIG. 1, when the flow rate of gas supplied to the fuel cell stack is low during partial load operation of the vehicle, the difference in the flow rate between the positions of the unit cells is not significant. However, as shown in FIG. 2, during a rapid change in load according to a driver's request, such as sudden acceleration, the flow rates according to the positions of the unit cells are not uniform, thus increasing the output voltage deviation.

In the unit cells adjacent to an inlet (e.g., first to third cells), there are regions where the flow rate is insufficient due to flow instability caused when a change in flow rate occurs due to a rapid change in load, compared to the unit cells spaced a predetermined distance. While the cross-sectional area of the manifold is constant, the amount of gas that can reach the unit cells spaced a predetermined distance is reduced. Therefore, an excessive amount of gas is supplied to the unit cells, but there are regions where the flow rate is insufficient due to a partial reduction in gas pressure, which results in a reduction in power generation. As a result, this leads to a limitation in power generation and, if this non-uniformity of the flow rate of gas supplied to the unit cells is out of the control range, it may develop into a failure in start-up and a shutdown of the vehicle.

In the past, in an attempt to solve these problems, a bipolar plate, in which a manifold is provided in the form of an internal manifold to minimize the design change of the existing bipolar plate and uniformly distribute the flow, has been proposed.

There are also various other techniques that have been proposed for addressing these problems, such as a technique for providing a uniform distribution of gas by changing the order of manifolds according to their sizes or changing the arrangement of bipolar plates, a technique for addressing the non-uniform flow rate of gas supplied to unit cells by stabilizing the flow rate before the gas is supplied to channels, a technique for stabilizing the flow rate by changing the shape and form of a separation window to separate the flow according to the size of a fuel cell stack and the flow velocity through a change in the stacking order of bipolar plates, etc.

For example, Korean Patent No. 0579308 (hereinafter "Patent Literature 1") describes a system for stabilizing flow distribution which comprises a flow distribution structure with a curved surface, a separation window for separating the flow of fluid supplied to manifolds at a predetermined ratio, a dummy cell, and a flow obstacle, in which the separation window is formed during manufacturing of a bipolar plate and comprises a plurality of stepped portions formed of a porous material.

Korean Patent Application Publication No. 10-2008-0076206 (hereinafter "Patent Literature 2") describes a manifold of a fuel cell stack which has a structure in which the cross-sectional area of an inlet manifold for supplying hydrogen and air to unit cells of the fuel cell stack is reduced as it goes from an inlet to an end portion, and an outlet manifold that increases as it goes from a start portion to an outlet.

Korean Patent No. 0637506 (hereinafter "Patent Literature 3") describes a fuel cell system which comprise a manifold whose cross-sectional area is reduced toward the center such that fuel and oxygen in an amount corresponding to a difference in temperature at the position of each power generation unit are supplied to a corresponding unit cell.

Korean Patent No. 0831462 (hereinafter "Patent Literature 4") describes a fuel cell stack which comprises a dual manifold including a flow stabilization manifold, and which is formed by stacking bipolar plates to uniformly distribute the flow of fluid to a plurality of unit cells.

Japanese Patent Application Publication No. 2006-147456 (hereinafter "Patent Literature 5") describes a gas supply manifold of a fuel cell stack which comprises a flow stabilization unit (buffer) added to an external supply tube.

However, the above-described conventional techniques disclosed in Patent Literatures 1 to 5 have the following problems.

First, according to Patent Literature 1, the separation window provided for the flow stabilization should be formed in the manifold during manufacturing of the bipolar plate, and thus it is difficult to mass produce the bipolar plates used in multiple unit cells (e.g. 400 unit cells) per fuel cell stack. Moreover, a predetermined length of the separation window is formed in a straight line and the plurality of stepped portions is formed thereafter, but the flow instability is not completely solved. Therefore, the porous flow obstacle in the form of a net and the dummy cell are further provided. However, the shape of the porous flow obstacle is complex, and thus its production is difficult. Moreover, the unstable flow region is filled with the dummy cell, which causes an unnecessary increase in volume and cost.

In Patent Literature 2, the arrangement of the bipolar plates is controlled to gradually increase or decrease the cross-sectional area of the manifolds. However, the production of the fuel cell stack is thereby complicated, reducing the productivity.

Moreover, in Patent Literature 3, when the cross-sectional area of the manifold is reduced toward the center to control the amount of heat generated, the flow is unstable, thereby causing voltage instability and damage to the unit cells.

Furthermore, in Patent Literature 4, when the flow stabilization manifold is formed in the bipolar plate, the production of the bipolar plate is complicated and the production cost increases.

In addition, in Patent Literature 5, when the buffer is provided on the outside of the fuel cell stack, the unused space of the system increases, and thus it is difficult to form the fuel cell stack in a compact size. Moreover, it is difficult to immediately satisfy the driver's request such as sudden acceleration using this system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a manifold insert having a plurality of improved flow distribution guides, and a fuel cell stack comprising the same. The present invention reduces output voltage deviation due to flow instability between unit cells and prevents local flow instability of electrodes by stably distributing the flow of fluid (such as air, hydrogen, and coolant) supplied to a fuel cell stack, thereby maintaining a stable performance of the unit cells.

In one aspect, the present invention provides a manifold insert having distribution guides, the manifold insert being configured to form a flow field from an inlet port of fluid to an outlet port connected to a fuel cell stack, the manifold insert comprising: a plurality of distribution guides for dividing the flow field from the inlet port to the outlet port such that the fuel cell stack is divided into a plurality of regions according to the distance from the inlet port. The distribution guides have curved surfaces such that the flow of the fluid from the inlet port to the outlet port is changed by the curved surfaces and form a plurality of guide flow fields for guiding the fluid to the divided regions of the fuel cell stack, such that the fluid is supplied to the divided regions of the fuel cell stack along the plurality of guide flow fields at different flow rates.

In a preferred embodiment, the inlet port is divided into a plurality of inlets having different cross-sectional areas, the plurality of inlets being connected to/in connection with the plurality of guide flow fields.

In another preferred embodiment, the cross-sectional area of each of the inlets with respect to the plurality of guide flow fields increases in proportional to the distance from the inlet port to each of the divided regions of the fuel cell stack.

In still another preferred embodiment, the manifold insert further comprises a pair of lateral members arranged in parallel to each other and forming an outer wall of the flow field, and the distribution guides are arranged perpendicular to a plane formed by the lateral members. It is noted that the parallel arrangement of the lateral members can vary slightly from parallel if desired, and the perpendicular arrangement of the distribution guides as they relate to the lateral members may also vary slightly from perpendicular if desired. Thus, arrangements other than precise parallel and perpendicular arrangements are also provided by the present invention (e.g. wherein the arrangement can vary by any amount up to about 10° from a parallel and perpendicular arrangement).

In yet another preferred embodiment, the distribution guide at the outermost side and the lateral members form the outer wall of the flow field.

In still yet another preferred embodiment, the manifold insert further comprises a position fixing member provided on the outermost distribution guide which forms the outer wall.

In a further preferred embodiment, the position fixing member has a plate-like shape which forms a rectangular profile together with the lateral members.

In another further preferred embodiment, the distribution guides are arranged perpendicular to the stacking direction of the fuel cell stack at the inlet port and arranged parallel to the stacking direction of the fuel cell stack at the outlet port.

In another aspect, the present invention provides a fuel cell stack comprising the manifold insert having the distribution guides.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

10a & 10b: lateral members
30: position fixing member
100: manifold insert having distribution guides
200: manifold
20a, 20b & 20c: distribution guides
$S_1$, $S_2$ & $S_3$: guide flow fields It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a manifold insert which distributes the flow of fluid supplied to a fuel cell stack, and a fuel cell stack comprising the same. The manifold insert comprises a plurality of improved flow distribution guides, including guide flow fields whose cross-sectional areas are changed to overcome flow instability between unit cells due to a change in load. The present invention, thus, ensures a stable performance of the unit cells.

As shown in FIG. 1, when the flow rate of gas supplied to a fuel cell stack is low during partial load operation of the vehicle, the flow rate of gas supplied to the entire fuel cell stack is substantially uniform. However, as shown in FIG. 2, during full load operation, such as sudden acceleration, flow instability occurs due to a rapid change in load in the unit cells adjacent to an inlet. As such, during such full load operation, flow instability in which the flow rate of gas supplied is reduced occurs in the unit cells spaced a predetermined distance from the inlet port.

Therefore, to solve the problem of the deterioration of distribution performance due to the flow instability, the present invention provides an improved manifold insert. In particular, the present invention provides a manifold insert having distribution guides which function to supply fluid to a fuel cell stack at a uniform flow rate through guide flow fields of divided regions. The present invention thereby uniformly distributes the flow of fluid supplied to the fuel cell stack even in the case of a rapid shift between partial load and full load.

Figure 3:
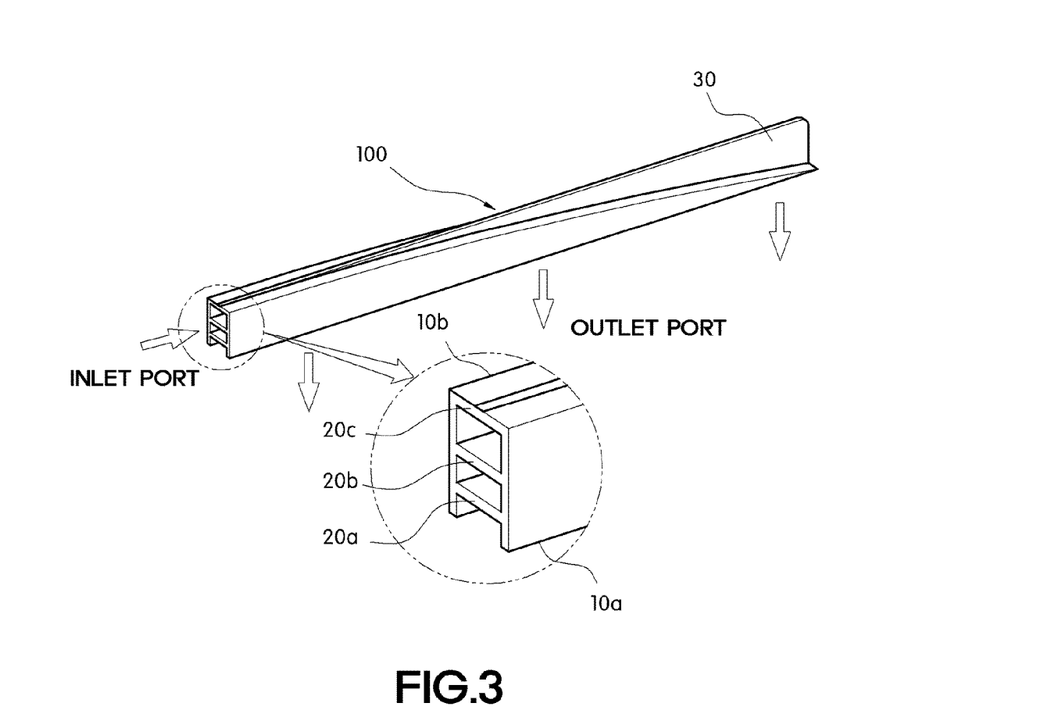
FIG. 3 is a perspective view showing the configuration of a manifold insert having distribution guides in accordance with a preferred embodiment of the present invention.
Figure 4:
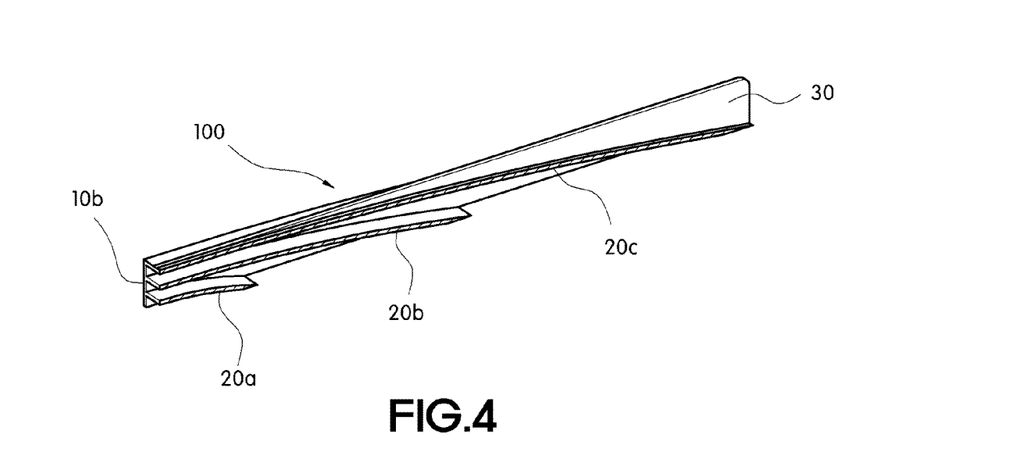
FIG. 4 is a cross-sectional view showing the configuration of a manifold insert having distribution guides in accordance with a preferred embodiment of the present invention.
Figure 5:
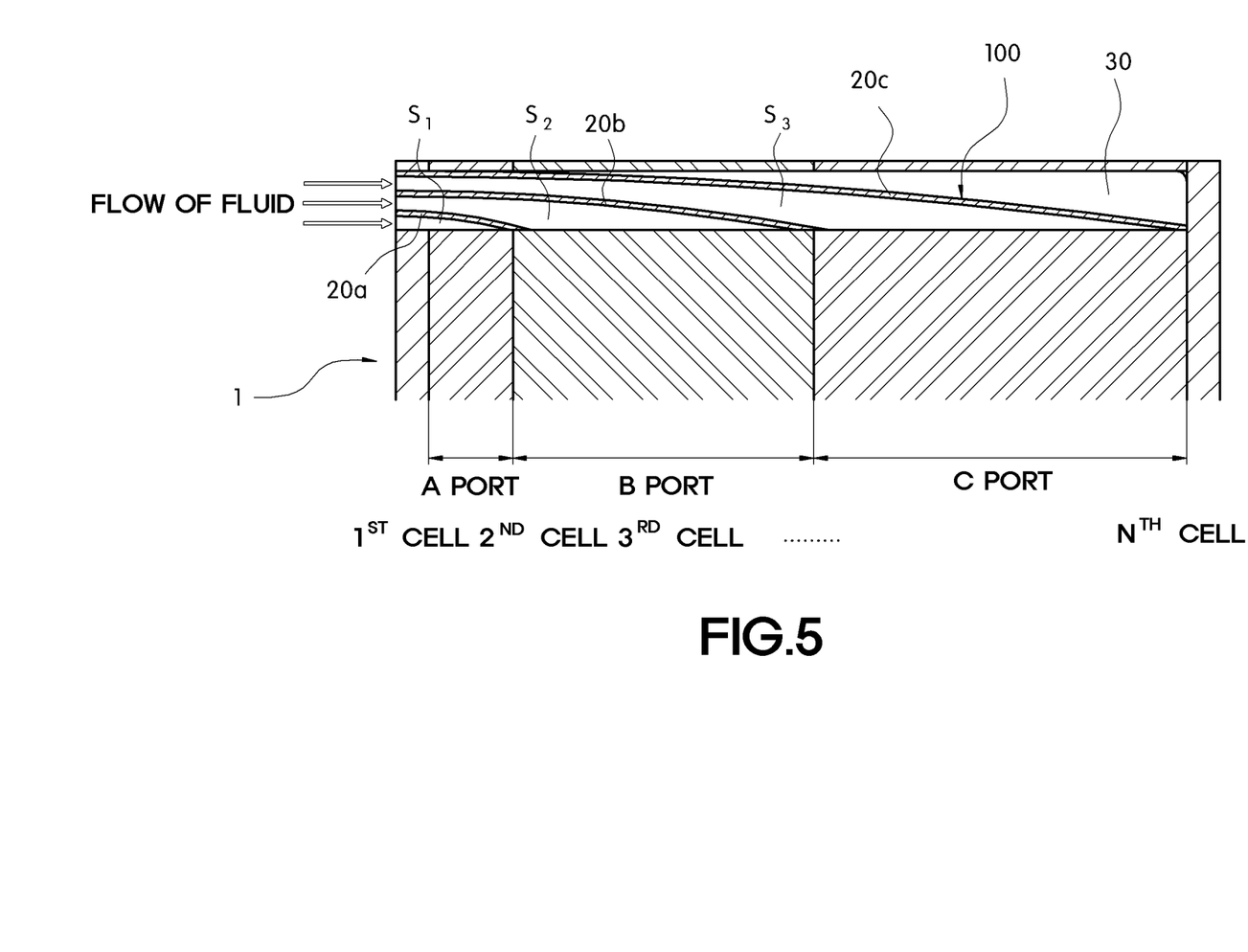
FIG. 5 is a cross-sectional view showing the distribution of the flow of fluid supplied to a fuel cell stack comprising a manifold insert having distribution guides in accordance with a preferred embodiment of the present invention.

FIG. 3 is a perspective view showing the configuration of a manifold insert having distribution guides in accordance with a preferred embodiment of the present invention, FIG. 4 is a cross-sectional view showing the configuration of a manifold insert having distribution guides in accordance with a preferred embodiment of the present invention, and FIG. 5 is a cross-sectional view showing the distribution of the flow of fluid supplied to a fuel cell stack comprising a manifold insert having distribution guides in accordance with a preferred embodiment of the present invention.

Referring to FIGS. 3 and 4, the manifold insert having the distribution guides according to the present invention forms a flow field which guides fluid from an inlet port, through which the fluid is introduced, to an outlet port, through which the fluid flows to the fuel cell stack.

In particular, the manifold insert 100 having the distribution guides according to the present invention comprises a pair of lateral members 10a and 10b arranged in parallel to each other, and an upper member connected to the pair of lateral members 10a and 10b to thereby form the flow field.

As shown in the embodiment of FIGS. 3 and 4, the upper member may be substituted with a distribution guide 20c at the outermost side. Therefore, in this case, the distribution guide 20c at the outermost side and the pair of lateral members 10a and 10b function as an outer wall to form the overall flow field.

As such, the plurality of distribution guides 20a, 20b and 20c (including the distribution guide at the outermost side 20c, which functions as the upper member), are arranged perpendicular to the planes formed by the lateral members 10a and 10b. In various embodiments, the distribution guides 20a, 20b and 20c are fixed to the lateral members 10a and 10b using any known fixation means which can be either permanent fixation means or removable fixation means which allows the distribution guides 20a, 20b and 20c to be separated from/attached and reattached to the lateral members 10a and 10b as desired (e.g. the distribution guides 20a, 20b, 20c may be integrally formed with the lateral members 10a and 10b as a one piece member, the distribution guides 20a, 20b, 20c may be attached to the lateral members 10a and 10b via any suitable adhesive or the like, grooves may be formed in the lateral members 10a and 10b into which the distribution guides 20a, 20b, 20c can be fixedly inserted and which can be further fixed using suitable adhesives or the like if desired, etc.). The distribution guides 20a, 20b, 20c, thus, support the lateral members 10a and 10b and divide the flow field into predetermined regions.

Therefore, in the present invention, the plurality of distribution guides 20a, 20b and 20c dividing the flow field are provided, and thus a plurality of guide flow fields $S_1$, $S_2$ and $S_3$ are formed.

The plurality of guide flow fields $S_1$, $S_2$ and $S_3$ are divided according to the relative distance from the inlet port of the fluid to the fuel cell stack, and each guide flow field $S_1$, $S_2$ and $S_3$ determines the relative cross-sectional area of the flow field at the inlet port and the relative distance from the inlet port to the outlet port.

The distribution guides 20a, 20b and 20c of the present invention are configured to form the plurality of guide flow fields and define a plurality of regions divided from the fuel cell stack adjacent to the flow fields such that the fluid flowing through the guide flow fields is supplied to the divided regions of the fuel cell stack at different flow rates. Therefore, in the manifold insert 100 having the distribution guides according to the present invention, the plurality of guide flow fields are formed by the distribution guides such that the fluid flows to the divided regions of the fuel cell stack at different flow rates in view of the relative distances from the inlet port to the divided regions of the fuel cell stack.

Moreover, in the present invention, each of the distribution guides 20a, 20b and 20c is formed with a smooth curved surface to change the flow of the fluid from the inlet port to the outlet port, thereby assisting the flow of the fluid and guiding the fluid to the divided regions of the fuel cell stack.

According to various embodiments, the entire guide surface of the distribution guide may have a curved surface, or the guide surface of the distribution guide may have a combination of a flat surface and a curved surface (e.g. as shown by distribution guides 20a, 20b and 20c in FIG. 4). That is, in the distribution guide of the present invention, a part thereof may have a curved surface such that the flow of the fluid is changed by the curved surface or this curved surface may be selectively combined with a flat surface. Any combination of distribution guides may be provided wherein, for example, all of the distribution guides have an entire curved surface or a combination of flat and curved surface, or wherein one or more have an entire curved surface and the remainder have a combination of flat and curved surface.

Preferably, the guide surface of the distribution guide may be arranged perpendicular to the stacking direction of the fuel cell stack at the inlet port and arranged parallel to the stacking direction of the fuel cell stack at the outlet port such that the flow of the fluid can be changed in the flow direction.

Therefore, in the manifold insert 100 having the distribution guides according to the present invention, the flow direction of the fluid supplied from the inlet port is gradually changed along the distribution guides 20a, 20b, 20c such that the fluid passes through the flow fields formed in the fuel cell stack.

Moreover, in the manifold insert 100 having the distribution guides (e.g. 20a, 20b, 20c) according to the present invention, the inlet port of the present invention is divided into a plurality of inlets, connected to the plurality of guide flow fields (e.g. $S_1$, $S_2$, $S_3$), by the distribution guides, e.g. as shown in FIG. 3. That is, the inlet port of the present invention comprises the plurality of inlets such that the fluid is supplied to the divided regions of the fuel cell stack at different flow rates.

Preferably, each of the plurality of inlets of the inlet port has a different cross-sectional area, which serves as an important factor that determines the flow rate of the fluid flowing through each guide flow field.

Therefore, in the preferred embodiment, the cross-sectional area of each of the inlets, determined with respect to each of the plurality of guide flow fields $S_1$, $S_2$ and $S_3$, increases in proportion to the distance from the inlet port to each of the divided regions of the fuel cell stack such that a relatively small amount of fluid is supplied to the fuel cell stack adjacent to the inlet port, thereby maintaining the balance of the flow rates.

Meanwhile, as shown in FIGS. 3 and 4, the manifold insert 100 having the distribution guides 20a, 20b, 20c according to the present invention may further comprise a position fixing member 30 provided on the outermost distribution guide 20c forming the outer wall. The position fixing member 30 can be configured so as to maintain the arrangement of the fuel cell stack from external vibration and impact.

The position fixing member 30 may have any structure which can fix the position of the fuel cell stack by supporting the curved surface of the upper member (e.g. 20c). As shown in FIGS. 3 and 4, the position fixing member 30 may have a plate-like shape which fills the space of the upper member such that the position fixing member 30 and the lateral members 10a and 10b can form a rectangular-like profile.

FIG. 5 shows the distribution of the flow of fluid supplied to the fuel cell stack comprising the manifold insert having the distribution guides having the above-described configuration.

As shown in FIG. 5, in the manifold insert 100 having distribution guides according to the present invention, the fuel cell stack connected to the manifold insert 100 is divided into a plurality of regions according to the flow rate and the pressure distribution. In particular, a first distribution guide 20a with respect to "A port", a second distribution guide 20b with respect to "B port", and a third distribution guide 20c with respect to "C port" are formed in the divided regions, respectively, such that the flow rates of the fluid supplied to the channels of the unit cells through the guide flow fields $S_1$, $S_2$ and $S_3$ are the same as each other.

The guide flow fields $S_1$, $S_2$ and $S_3$ have the curved surfaces formed by the distribution guides 20a, 20b and 20c. The fluid supplied through the inlets (which have different cross-sectional areas) of the guide paths $S_1$, $S_2$ and $S_3$ at different flow rates is uniformly distributed into the divided regions of the fuel cell stack (such as A, B and C ports).

Therefore, in the preferred embodiment of the present invention, it is possible to supply a sufficient amount of fluid even to a region far away from the inlet port, and thus the flow stability is improved. Moreover, it is possible to reduce the flow rate of the fluid supplied to the region adjacent to the inlet port, and thus the fluid can be uniformly distributed.

Figure 6:
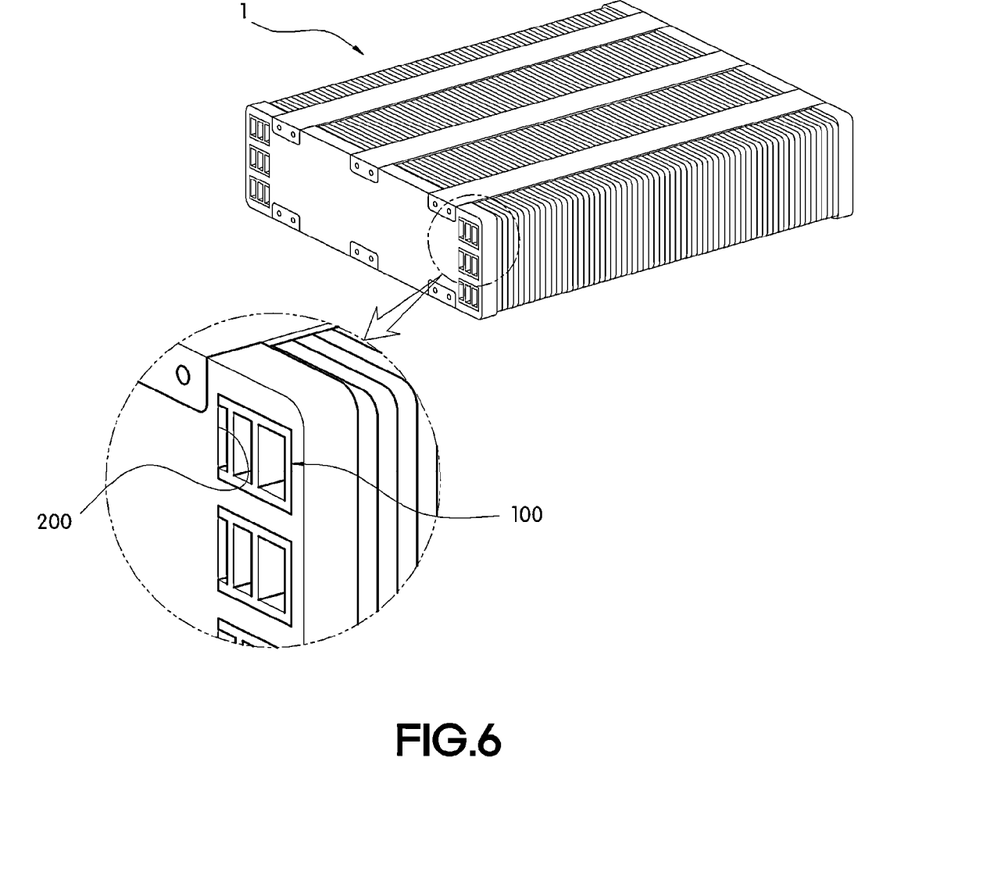
FIG. 6 is a perspective view showing the configuration of a fuel cell stack comprising a manifold insert having distribution guides in accordance with a preferred embodiment of the present invention.

FIG. 6 is a perspective view showing the configuration of a fuel cell stack 1 comprising the manifold insert 100 having the distribution guides in accordance with the above-described embodiment of the present invention.

As shown in FIG. 6, the manifold insert 100 having the distribution guides according to the present invention is inserted into a manifold 200 formed when bipolar plates of the fuel cell stack are repeatedly stacked, thus facilitating the assembling and manufacturing of the manifold insert 100 and the manifold 200.

Figure 7:
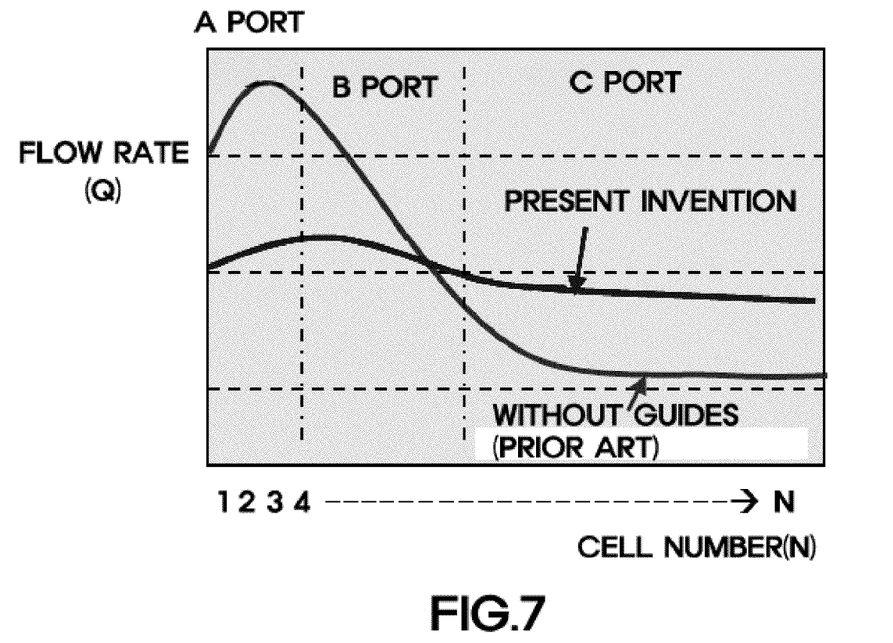
FIG. 7 is a graph showing the distribution of the flow of fluid supplied to a fuel cell stack comprising a manifold insert having distribution guides during full load operation with respect to the cell number (stacking order) in accordance with a preferred embodiment of the present invention.

FIG. 7 is a graph showing the distribution of the flow of fluid supplied to the fuel cell stack during full load operation with respect to the cell number (stacking order), wherein the fuel cell stack comprises the manifold insert having the distribution guides in accordance with the present invention.

As shown in FIG. 7, even during full load operation, the flow of the fluid is uniformly distributed to all the unit cells, unlike the case where no distribution guides are provided.

It is noted that while the present manifold insert has been described in connection with the embodiments wherein three distribution guides (20a, 20b, 20c) are provided to thereby form three guide flow fields ($S_1$, $S_2$, $S_3$), wherein these three guide flow fields guide the fluid to the divided regions of the fuel cell stack, the present invention is not thereby limited. Rather, the present invention includes any number of distribution guides which form the desired number of guide flow fields, wherein these guide flow fields supply fluid to the divided regions of the fuel cell stack. Thus, various combinations of numbers of divided regions of the fuel cell stack, numbers of distribution guides, and numbers of guide flow fields can be provided (e.g. wherein more or fewer divided regions, distribution guides, and/or guide flow fields than those described in connection with the depicted embodiment can be provided).

As described above, the manifold insert having the distribution guides and the fuel cell stack comprising the same according to the present invention have the following effects.

First, the manifold insert having the distribution guides according to the present invention can solve the non-uniformity of flow rate for each unit cell, which occurs during a rapid change in load according to a driver's request, such as partial load and full load, in a high power fuel cell stack for a vehicle.

Moreover, the manifold insert having the distribution guides according to the present invention can prevent flow instability at the first and $n^{th}$ unit cells (at both ends of the fuel cell stack) during a rapid change in load, flow rate, or pressure, thereby ensuring a stable supply of fluid to all the unit cells.

Furthermore, according to the present invention, with the stable supply of fluid to the fuel cell stack, it is possible to prevent damage to the components of the fuel cell stack (such as electrolyte, electrodes, bipolar plates, etc.) due to a local lack of fuel and oxygen in the fuel cell stack.

In addition, the manifold insert of the present invention can be formed into a simple structure which comprises a guide structure provided in each predetermined region of the fuel cell stack.

Additionally, the manifold insert having the distribution guides according to the present invention can be inserted into the manifold formed when the bipolar plates of the fuel cell stack are repeatedly stacked, and thus the degree of freedom of design is high and the manifold insert can be easily formed by plastic injection molding, for example.

Moreover, when the position fixing member of the present invention is used, it is possible to further maintain the arrangement of the fuel cell stack from external vibration and impact applied in a direction perpendicular to the stacking direction of the unit cells.

Furthermore, according to the present invention, it is possible to eliminate dummy cells which do not participate in power generation and are conventionally mounted to the inlet port to minimize flow instability in the unit cells adjacent to the inlet port.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A manifold insert installed in a fuel cell stack, the manifold insert being configured to form a flow field from an inlet port of fluid to an outlet port connected to the fuel cell stack, the manifold insert comprising:
a plurality of distribution guides for dividing the flow field from the inlet port to the outlet port such that the fuel cell stack is divided into a plurality of regions according to a distance from the inlet port,
wherein the plurality of distribution guides each have a surface that is at least partially curved such that a flow of a fluid from the inlet port to the outlet port is changed by the surface that is at least partially curved, and form a plurality of guide flow fields for guiding the fluid to the plurality of regions that are divided of the fuel cell stack such that the fluid is supplied to the plurality of regions that are divided of the fuel cell stack along the plurality of guide flow fields at different flow rates
wherein the inlet port is formed along a first plane and the outlet port is formed along a second plane, the second plane substantially perpendicular to the first plane, and
wherein each consecutive distribution guide of the plurality of distribution guides extends beyond its subsequent distribution guide along the second plane from an inlet port side of the fuel cell stack to an nth region of the plurality of regions.

2. The manifold insert of claim 1, wherein the inlet port is divided into a plurality of inlets connected to the plurality of guide flow fields, wherein the plurality of inlets have different cross sectional areas.

3. The manifold insert of claim 2, wherein the cross-sectional area of each of the plurality of inlets with respect to the plurality of guide flow fields increases in proportion to the distance between the inlet port and each of the plurality of regions of the fuel cell stack.

4. The manifold insert of claim 1, further comprising a pair of lateral members arranged in parallel to each other and forming outer walls of the flow field,
wherein the plurality of distribution guides are arranged perpendicular to planes formed by lateral members.

5. The manifold insert of claim 4, wherein a distribution guide of the plurality of distribution guides is formed at an outermost side of the manifold insert further forms an outer wall of the flow field.

6. The manifold insert of claim 5, further comprising a position fixing member provided on the distribution guide at the outermost side of the manifold insert.

7. The manifold insert of claim 6, wherein the position fixing member has a plate shape which forms a rectangular profile together with lateral members.

8. The manifold insert of claim 1, wherein the plurality of distribution guides are arranged perpendicular to a stacking direction of the fuel cell stack at the inlet port, and are arranged parallel to the stacking direction of the fuel cell stack at the outlet port.

9. A fuel cell stack comprising the manifold insert having the distribution guides of claim 1.

10. A vehicle comprising the fuel cell stack of claim 9.

* * * * *